United States Patent [19]

Glennon et al.

[11] Patent Number: 4,868,406

[45] Date of Patent: Sep. 19, 1989

[54] ELECTRICALLY COMPENSATED CONSTANT SPEED DRIVE WITH PRIME MOVER START CAPABILITY

[75] Inventors: Timothy F. Glennon, Rockford; William E. McCracken, Elmhurst, both of Ill.

[73] Assignee: Sundstrand Corporation, Rockville, Ill.

[21] Appl. No.: 215,720

[22] Filed: Jul. 5, 1988

[51] Int. Cl.[4] ............... F02N 11/04; H02P 11/00
[52] U.S. Cl. ................... 290/4 R; 322/29
[58] Field of Search ............. 290/4 R, 4 C, 22, 27, 290/36 R; 322/17, 29

[56] References Cited

U.S. PATENT DOCUMENTS

| | | | |
|---|---|---|---|
| 4,401,938 | 8/1983 | Cronin | 322/29 |
| 4,481,459 | 11/1984 | Mehl et al. | 322/10 |
| 4,572,961 | 2/1986 | Borger | 290/4 R |
| 4,636,707 | 1/1987 | Law | 322/35 |
| 4,692,671 | 9/1987 | Dishner et al. | 318/11 |
| 4,697,090 | 9/1987 | Baker et al. | 290/4 R |
| 4,734,626 | 3/1988 | Sutrina et al. | 290/4 R X |
| 4,777,376 | 10/1988 | Dishner | 290/4 R |

Primary Examiner—William M. Shoop, Jr.
Assistant Examiner—W. E. Duncanson, Jr.
Attorney, Agent, or Firm—Marshall, O'Toole, Gerstein, Murray & Bicknell

[57] ABSTRACT

An electrically compensated constant speed drive includes a mechanical differential having first and second input shafts and an output shaft wherein a prime mover is coupled to the first input shaft, a brushless generator is coupled to the differential output shaft and includes a control permanent magnet generator (PMG) and a main generator which develops output power and a speed compensation link is coupled between the control PMG and the second differential shaft. The speed compensation link includes a dynamoelectric machine coupled to the second differential input shaft and a power converter which interconnects armature windings of the control PMG and electrical power windings of the dynamoelectric machine. A generator control unit controls the flow of power between the control PMG and the dynamoelectric machine so that the dynamoelectric machine develops compensating speed of a magnitude sufficient to maintain the output shaft of the differential at a desired speed so that the brushless generator develops constant frequency AC power. The present constant speed drive is lighter and smaller than prior electrically compensated constant speed drives.

12 Claims, 7 Drawing Sheets

ELECTRICALLY COMPENSATED CONSTANT SPEED DRIVE WITH PRIME MOVER START CAPABILITY

TECHNICAL FIELD

The present invention relates generally to constant speed drives, and more particularly to an electrically compensated constant speed drive for converting variable speed motive power into constant speed motive power for driving a generator so that it produces constant frequency electrical power wherein the drive has the capability of starting a prime mover connected thereto.

BACKGROUND ART

Electrically compensated constant speed drives (ECCSD's have been proposed for use in applications where conventional hydromechanical constant speed drives have been found inadequate. For example, Dishner, et al. U.S. Pat. No. 4,695,776, assigned to the assignee of the instant application and Borger U.S. Pat. No. 4,572,961 disclose ECCSD's including a differential having first and second input shafts coupled to a speed-compensation link and an output shaft at which the constant speed motive power is developed wherein a prime mover is coupled to the first input shaft. The speed-compensation link includes first and second permanent magnet machines interconnected by a power converter. In Dishner, et al., the power converter comprises a first AC/DC converter, a DC/DC converter and a second AC/DC converter. In Borger, the machines are interconnected by a power converter comprising either a DC link converter or a cycloconverter.

Dishner, et al. U.S. Pat. No. 4,692,671, assigned the assignee of the instant application discloses an electrically compensated constant speed drive of the "input differential" type wherein a prime mover is coupled to a first input shaft of a differential and a speed-compensation link is coupled between a second input shaft and an output shaft of the differential. The speed-compensation link includes first and second permanent magnet machines interconnected by an electrical power converter like that disclosed in the Dishner, et al. '776 patent described above.

In each of the foregoing ECCSD's, the power flow between the permanent magnet machines in the speed-compensation link is controlled so that compensating speed of a proper magnitude and direction is supplied to the second differential input shaft to keep the output shaft of the differential at a desired speed. This, in turn, causes a synchronous generator driven by the differential output shaft to develop constant frequency AC power.

Baker U.S. Pat. No. 4,694,187 discloses an electromechanical constant speed drive generating system wherein a first input shaft of a differential is coupled to an output shaft of a prime mover, an output shaft of the differential is coupled to a main generator and a speed-compensation link is coupled between armature windings of the main generator and a second input shaft of the differential. The speed-compensation link includes a dynamoelectric machine having a motive power shaft coupled to the second input of the differential and a power converter coupled between the main generator armature windings and electrical power windings of the dynamoelectric machine. Power flow between the electromechanical machine and the main generator armature windings is controlled so that the output shaft of the differential is maintained at a constant speed.

A power generating system which includes a constant speed drive having a single dynamoelectric machine and a power converter in the speed-compensation link thereof is disclosed in Cook, et al. U.S. patent application Ser. No. 15,903, filed Feb. 18, 1987, and entitled "Power Generating System". This speed-compensation link is also connected between armature windings of a main generator driven by an output shaft of a differential and an input shaft of the differential.

Law U.S. Pat. No. 4,636,707 discloses a power generating system wherein a wind-driven turbine is coupled to a first input shaft of a differential having an output shaft coupled to a generator. A second input shaft of the differential is coupled to a synchronous generator which is in turn coupled to a thyristor-controlled variable load. The thyristors of the load are operated such that the energy of wind gusts on the turbine is absorbed partly by accelerating the turbine and partly by the thyristor-controlled load.

Constant speed drives have also been used to accelerate the prime mover from standstill up to self-sustaining speed. For example, Baker, et al. U.S. Pat. No. 4,697,090 discloses a starting system and method for the constant speed drive disclosed in the Dishner, et al. '776 patent. When operating in a starting mode, external power is provided to the permanent magnet machine coupled to the second differential input shaft so that this machine operates as a motor to accelerate the shaft. This, in turn, accelerates the output shaft of the differential so that the generator connected thereto is brought up to synchronous speed. Once synchronous speed is reached, external power is supplied to the generator so that it develops motive power. Thereafter, the permanent magnet machine coupled to the second differential shaft is operated so that it supplies the same magnitude of torque on the second differential input shaft as the magnitude of torque imposed on the differential output shaft by the generator. This balancing torque provided by the permanent magnet machine is developed by drawing power therefrom. The combined operation of the permanent magnet machine and the generator causes motive power to be returned through the differential to the prime mover to bring it up to self-sustaining speed.

The Cook, et al. system described above may also be utilized in a starting mode to start the prime mover. In this mode, power from an external power source is applied either directly to the electrical power windings of the main generator or to the windings of the main generator through the power converter in the speed-compensation link so that the motive power shaft of the main generator is accelerated toward synchronous speed. Rotation of the main generator motive power shaft in turn causes the motive power shaft of the dynamoelectric machine in the speed-compensation link to rotate in a direction opposite its direction of rotation when in the generating mode. Once synchronous speed of the main generator is reached, the main generator is connected directly to an external AC power source, if it is not already connected thereto, so that the generator operates as a synchronous motor. An electrical load is then applied to the dynamoelectric machine so that a balancing torque is developed. The generator and dynamoelectric machine together cause starting torque to be transferred through the differential to the prime mover to start same.

The Baker '187 patent likewise discloses that the system disclosed therein may be used in a starting mode. In this system, the main generator is operated as a motor and the power converter in the speed-compensation link is operated to transfer power from the electromagnetic machine coupled to the second differential input shaft. Motive power is thus developed which is transferred through the differential to the prime mover to start same.

Other types of generating systems have been developed which include prime mover start capability. Cronin U.S. Pat. No. 4,401,938 discloses the use of an induction machine driven by an engine and which operates in a generating mode to develop polyphase AC power whereby excitation for the induction machine is provided by a permanent magnet generator which is driven by a toroidal differential drive coupled to the output of the engine. The system is operable in a starting mode during which an engine starting circuit provides a programmed frequency and voltage to the induction machine to cause it to operate as a motor and thereby bring the engine up to operating speed.

Mehl U.S. Pat. No. 4,481,459, assigned to the assignee of the instant application discloses an engine starting and generating system wherein a rotor of a brushless, synchronous generator including a permanent magnet generator, an exciter and a main generator is coupled to the output of a prime mover by a torque converter. The system is operable in a starting mode by emptying the torque converter and by providing power to the permanent magnet generator to cause it to accelerate the rotor of the synchronous generator up to synchronous speed. Thereafter, power is applied to the generator to cause it to operate as a synchronous motor and thereby develop motive power. The torque converter is then filled so that the motive power is transmitted to the prime mover to bring it up to self-sustaining speed.

SUMMARY OF THE INVENTION

In accordance with the present invention, an electrically compensated constant speed drive is capable of use in a generating mode to produce constant frequency AC power from variable speed motive power developed by a prime mover and is also capable of use in a starting mode whereby motive power is developed ad returned to a prime mover to bring it up to self-sustaining speed.

More particularly, an ECCSD for producing constant frequency AC power from variable speed motive power produced by a prime mover includes a mechanical differential having first and second input shafts and an output shaft wherein the prime mover is coupled to the first input shaft, a brushless generator is coupled to the output shaft and includes a control permanent magnet generator (PMG) and a main generator which develops output power and a speed compensation link is coupled between the control PMG and the second differential input shaft. The speed compensation link includes a dynamoelectric machine having a motive power shaft which is coupled to the second input shaft of the differential. A power converter interconnects electrical power windings of the control PMG and the dynamoelectric machine. Means are coupled to the power converter for controlling the flow of power between the control PMG and the dynamoelectric machine whereby the dynamoelectric machine develops compensating speed of a magnitude sufficient to maintain the output shaft of the differential and a motive power shaft of the brushless generator at a desired speed so that the brushless generator develops constant frequency AC power.

The drive further includes a controllable clutch coupled between the first input shaft of the differential and the output shaft thereof, a torque converter coupled between the prime mover and the first input shaft of the differential and an overrunning clutch coupled across the torque converter which can transmit motive power in one direction only from the prime mover to the differential. During operation in the starting mode, the controllable clutch is closed and the torque converter is emptied of hydraulic oil to prevent the transfer of motive power from the differential to the prime mover. The power converter is then operated to provide power to the control PMG so that the rotor of the brushless generator is accelerated up to a particular speed. Once the particular speed is reached, external AC power is provided to the armature windings of the brushless generator so that the generator is operated as a motor to develop motive starting power. The torque converter is then filled with oil to couple the prime mover to the clutch so that the prime mover receives the motive starting power and is accelerated to self-sustaining speed. Thereafter, the torque converter is emptied and the prime mover provides motive power to the differential through the overrunning clutch alone so that efficiency is maintained at a high level.

The drive of the present invention is simple in nature, inasmuch as the power for the dynamoelectric machine is derived from the control PMG of the brushless generator itself. Further, the start function is accomplished simply by adding only the torque converter, overrunning clutch and contactors to control the application of power to the control PMG and the main generator armature windings.

DESCRIPTION OF THE PREFERRED EMBODIMENTS

Figure 1:
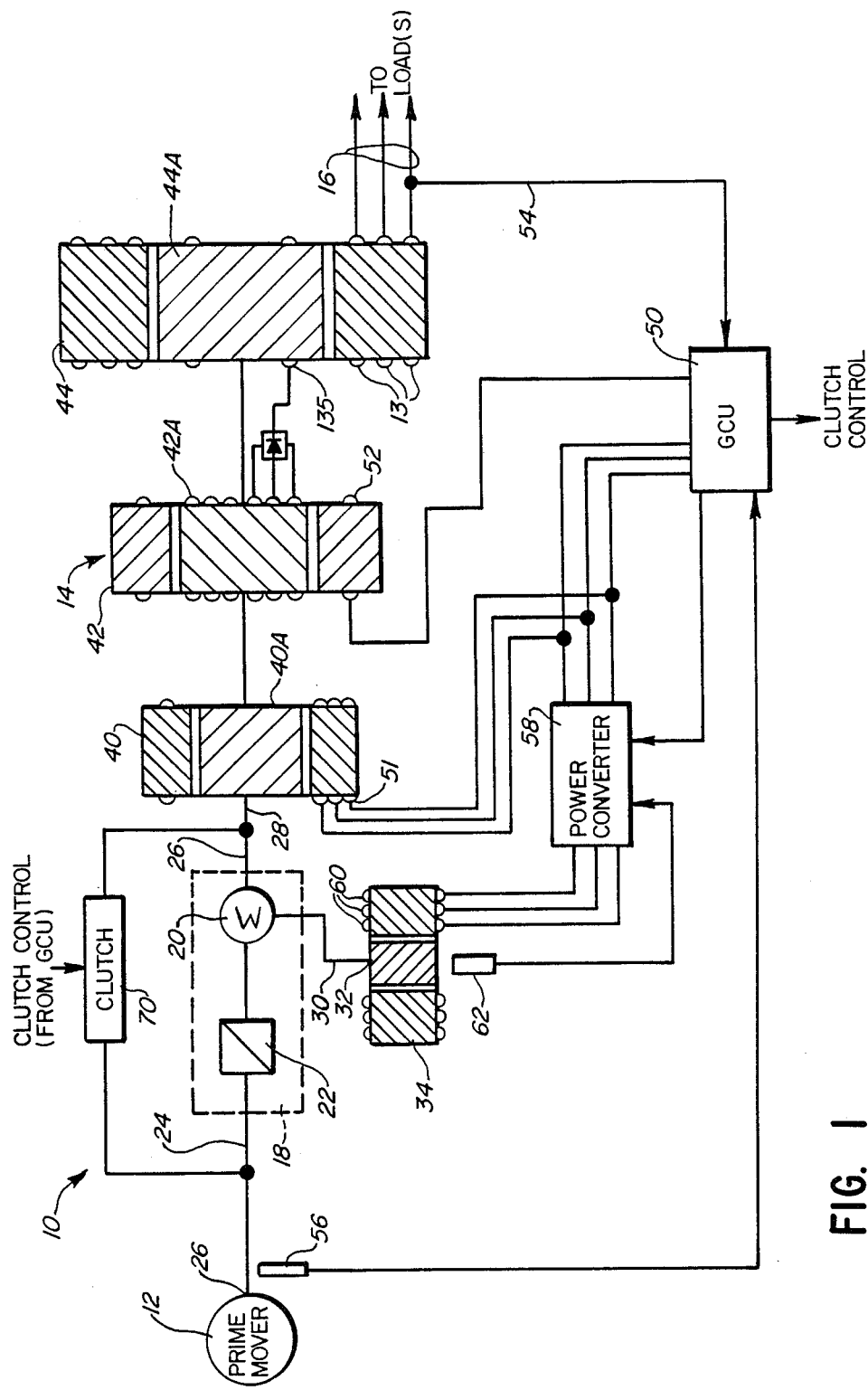
FIG. 1 is a block diagram of the electrically compensated constant speed drive of the present invention.

Referring now to FIG. 1, an electrically compensated constant speed drive (ECCSD) 10 converts variable speed motive power produced by a prime mover 12 into constant frequency AC output power. The output power is developed in armature windings 13 of a brushless synchronous generator 14 connected to a set of output lines or conductors 16. The ECCSD 10 further includes a mechanical differential 18 illustrated as a speed summer 20 and an internal gear box or speed multiplier 22. A first input shaft 24 of the differential 18 is coupled to an output shaft 26 of the prime mover 12 while an output shaft 26 of the differential 18 is coupled to a motive power shaft 28 of the brushless generator 14. A second input shaft 30 of the differential 18 is coupled to a motive power shaft 32 of a speed-compensating dynamoelectric machine 34 in the form of a permanent magnet motor (PMM).

Although not shown for purposes of clarity, a further gear box or speed multiplier may be coupled between the motive power shaft 32 of PMM 34 and the input shaft 30 of the differential 18.

The brushless generator 14 includes a control permanent magnet generator (PMG) 40, an exciter 42 and a main generator 44. The control PMG 40, exciter 42 and main generator 44 include rotor portions 40a, 42a and 44a, respectively, which are interconnected by the motive power shaft 28. A generator control unit (GCU) 50 receives output power developed by the control PMG 40 and controls the field current provided to a field winding 52 of the exciter 42 in accordance with the voltage, current or other parameter of the output power developed in the armature windings 13. For example, the GCU 50 may sense the voltage developed on one of the lines 16, as represented by the feedback line 54, and may control the exciter field current to maintain the output voltage of the main generator 44 at a desired value. Current limiting and/or other fault protection schemes may be employed, if desired.

The GCU 50 also receives an input signal developed by a speed sensor 56 which senses the speed of the prime mover shaft 26. The GCU 50 controls a power converter 58 which is coupled between armature windings 51 of the control PMG and armature windings 60 of the PMM 34. The GCU 50 and power converter 58 operate the PMM 34 to provide compensating speed at a magnitude sufficient to keep the speed of the shaft 26 at a constant speed for prime mover speeds greater than a first minimum value and less than a second maximum value. In the preferred embodiment, the constant speed drive operates below "straight through", i.e. the prime mover speed at which no compensating speed need be provided by the PMM 34 to maintain the speed of the output shaft 26 at the desired speed. More specifically, in the preferred embodiment the speed of the output shaft 26 of the differential 18 is maintained at 24,000 rpm while the operational speed range of the prime mover 12 is between 12,000 rpm and 24,000 rpm (assuming for purposes of simplicity that the speed multiplier 22 effects a 1:1 speed multiplication). Thus, PMM 34 supplies between 12,000 rpm and zero rpm during operation in the generating mode and power flow through the power converter 58 is unidirectional from the control PMG 40 to the PMM 34.

The GCU 50 operates the power converter 58 in a known fashion to in turn control the speed of the PMM 34. In addition, torque limiting may be provided, if necessary or desirable. The power converter 58 may include a control of any known design which is capable of controlling the speed and torque of a permanent magnet machine in response to commands issued by the GCU 50.

Figure 6:
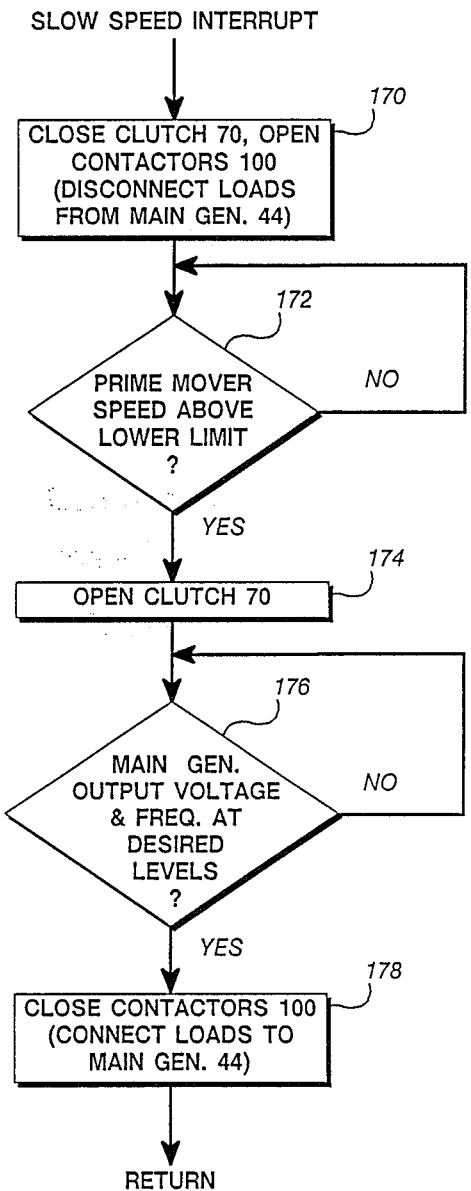
FIG. 6 is, a flow chart illustrating a further portion of the program executed by the GCU shown in FIG. 4.

Alternatively, the power converter 58 may be controlled by circuitry disclosed in Glennon U.S. Pat. No. 4,608,527, the disclosure of which is hereby incorporated by reference. The control circuit disclosed in the '527 patent is illustrated as controlling the position of a load in response to a load position command signal. The control circuit may be modified in a straightforward fashion so that it is responsive to the speed commands issued by the GCU 50 and a rotor position signal developed by a rotor position sensor 62 which detects the position of the rotor of PMM 34. In this case the speed error signal circuit 42 illustrated in FIG. 6 of the '527 patent would not be used and speed error from the GCU 50 would be provided directly to the phase angle real current error signal circuit 44 shown in such patent.

If the GCU 50 detects from the output of the speed sensor 56 that the speed of the prime mover shaft 26 is below the lower operational limit, the GCU 50 disables the power converter 58 and deenergizes a normally-closed electrically controlled clutch 70 connected between the output shaft 26 and the first input shaft 24 so that the differential 20 is bypassed. This prevents the power converter 58 from operating the PMM 34 above its designed maximum speed. Further, inasmuch as the motive power shaft 28 of the generator 14 can no longer be driven at the constant desired speed, the GCU 50 disconnects any loads from the main generator armature windings 13.

When the speed of the output shaft 26 of the prime mover 12 rises above the minimum operational speed, the clutch 70 is energized and thus opened by the GCU 50 so that the drive operates in the generating mode. Once the proper output voltage and frequency are developed by the main generator 44, the loads are reconnected thereto.

Figure 2:
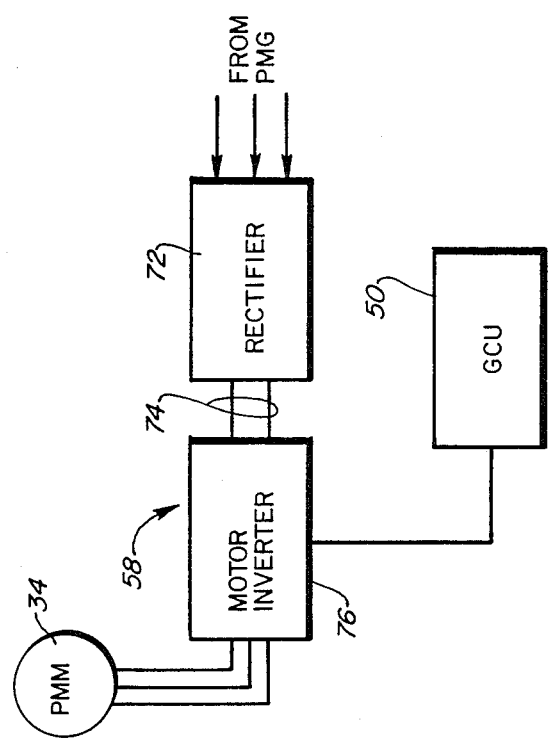

As should be evident, the power developed in the armature windings 51 of the control PMG 40 is at a constant frequency when the drive 10 operates in the generating mode. This power must be converted by the power converter 58 to appropriately energize the armature windings 60 of the PMM 34. As seen in FIG. 2, the power converter 58 may comprise a rectifier circuit 72 which develops DC power on a DC link 74 and a motor inverter circuit 76 which converts the power on the DC link 74 into AC power at a controllable voltage and frequency. The rectifier circuit 72 may comprise six power diodes coupled in a conventional three-phase bridge configuration whereas the motor inverter 76 may comprise six power transistors connected in a conventional three-phase inverter configuration with the usual flyback diodes coupled in antiparallel relation across the transistors. The transistors are operated in a pulse width modulated mode of operation by the GCU 50, as is conventional.

Figure 3:
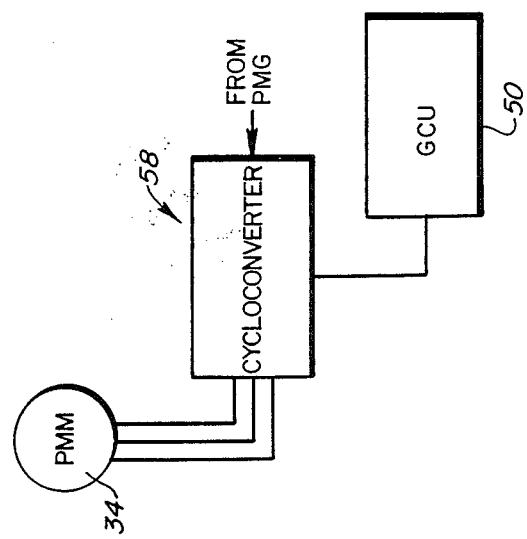
FIGS. 2 and 3 are partial block diagrams illustrating the power converter shown in FIG. 1.

As seen in FIG. 3, the power converter 58 may instead comprise a cycloconverter having a plurality of power transistors or SCR's which directly convert the constant frequency output of the control PMG 40 into AC power at a controllable voltage and frequency. The GCU 50 10 controls the power transistors or SCR's in the cycloconverter.

It should be noted that the control PMG 40 must be sized to handle the increased power demands placed upon it during operation in the generating mode inasmuch as the power which it must provide to the PMM 34 may be as much as 50% of the main generator power for a prime mover operational speed range of 2:1. If the control PMG 40 is sized to accommodate this power requirement, short circuit of the main generator output can be handled without loss of control over the speed of the generator 14.

Figure 4:
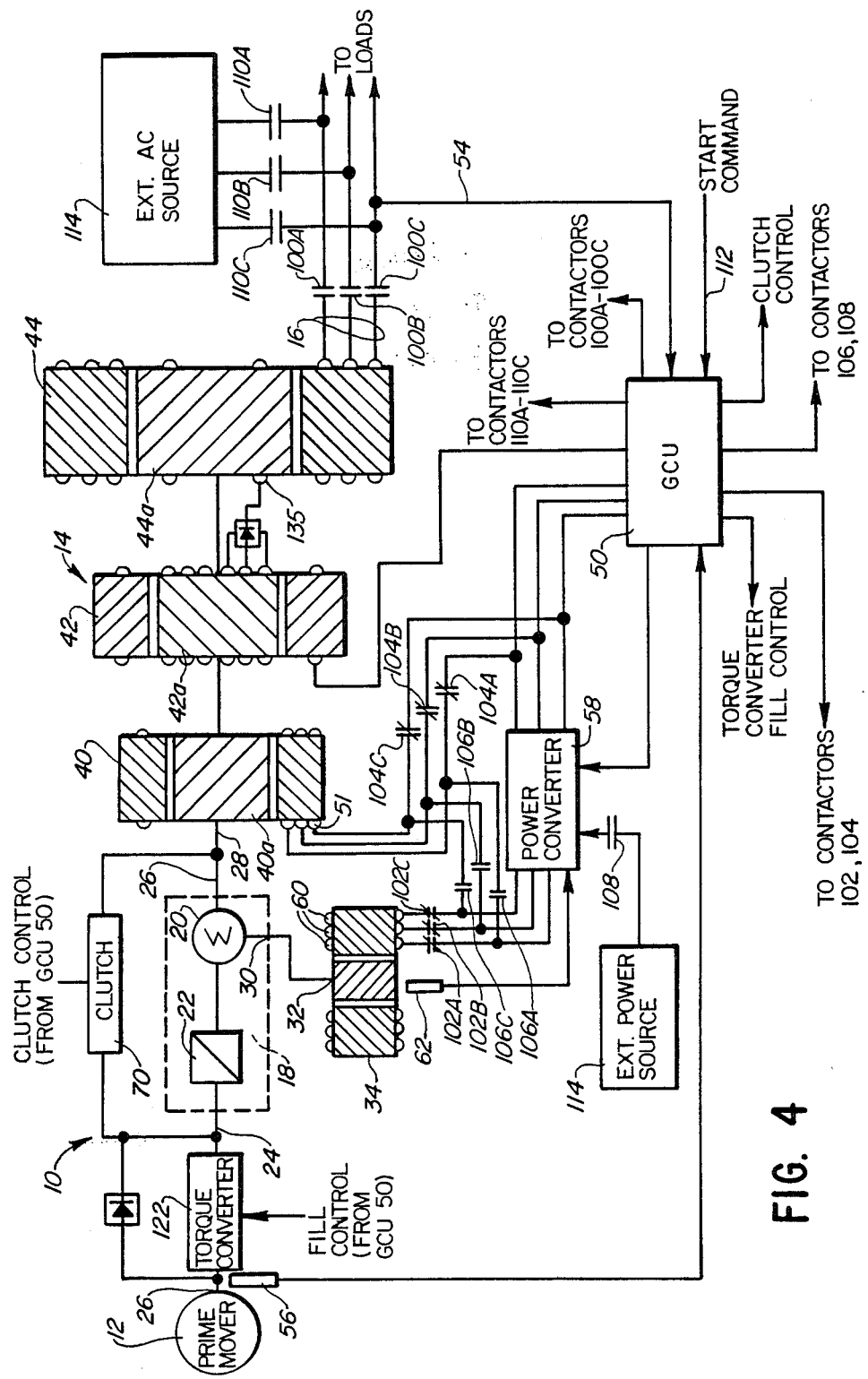
FIG. 4 is a block diagram illustrating modifications to the drive of FIG. 1 to render the drive operable in the starting mode of operation.

The drive of FIG. 1 may be modified as shown in FIG. 4 to incorporate a start mode of operation during which the prime mover 12 is accelerated from standstill up to self-sustaining speed. Elements common between FIGS. 1 and 4 are assigned like reference numerals.

Figure 5A:
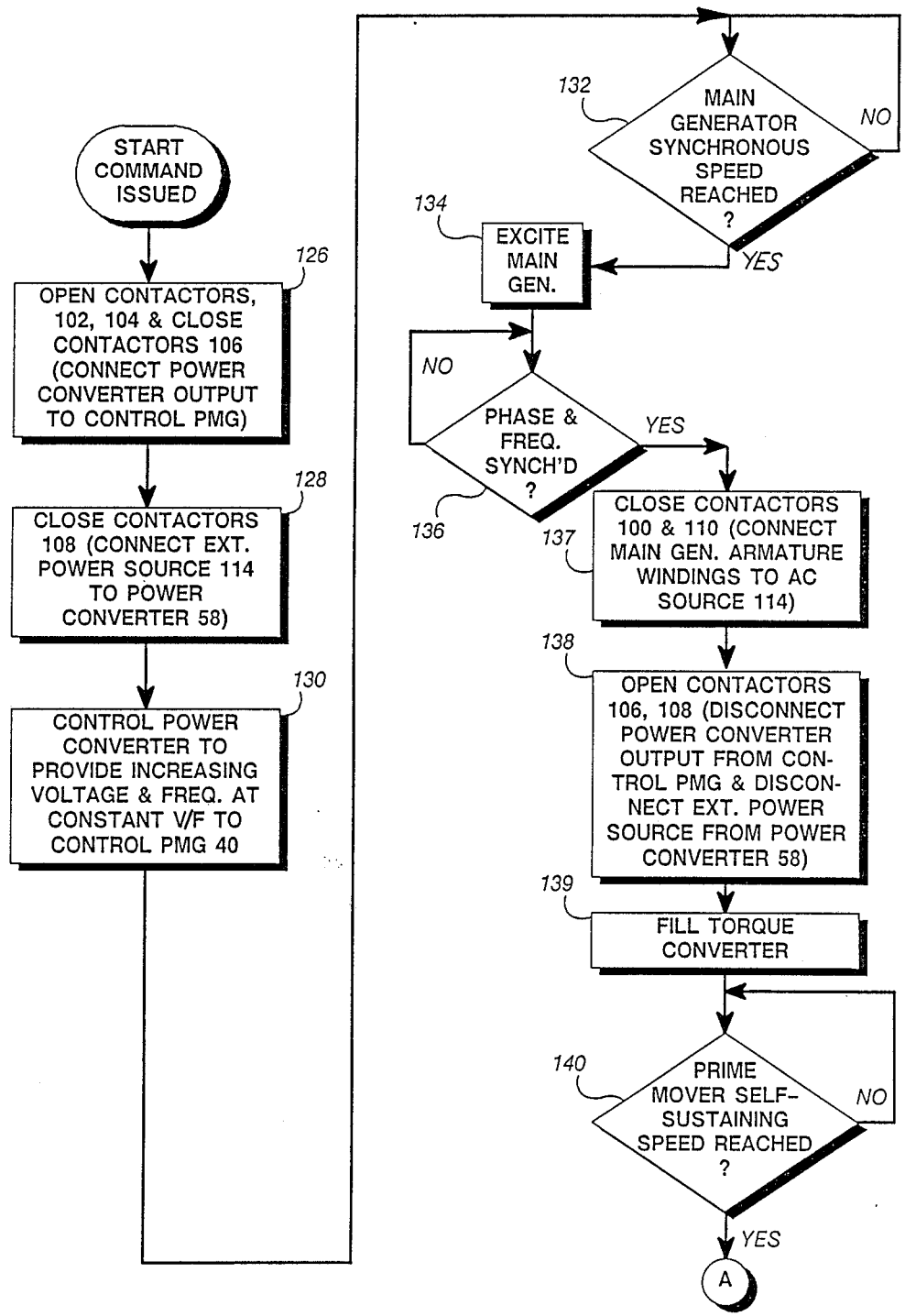
FIGS. 5a and 5b, when joined along the similarly lettered line, together comprise a flow chart illustrating a portion of the programming executed by the GCU shown in FIG. 4.
Figure 5B:
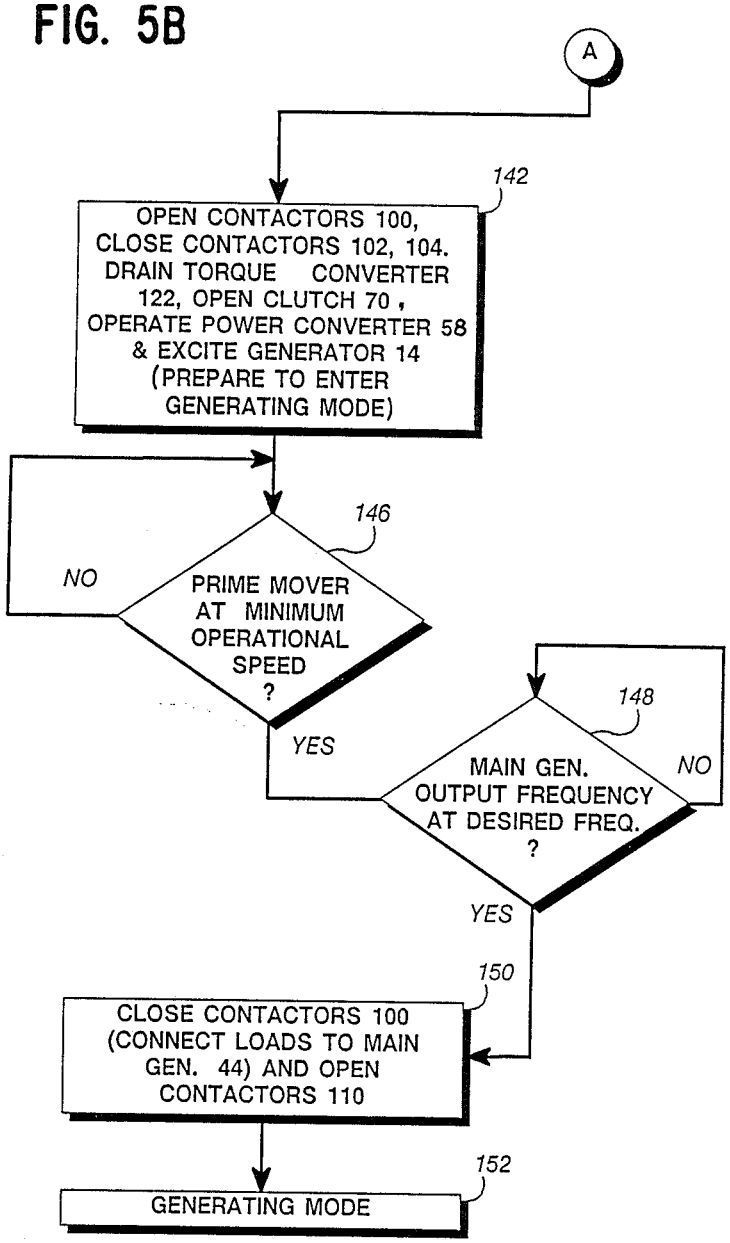

The flow charts of FIGS. 5a and 5b illustrate the programming of the GCU 50 to effect the start mode of operation. The programming is responsive to a start command issued on a line 112 by an operator. It should be noted at this time that that the clutch 70 is deenergized (i.e. closed) and a controllable torque converter 122 coupled between the point of connection of the controllable clutch 70 with the input shaft 24 and the output shaft 26 of the prime mover 12 is emptied of hydraulic oil so that the prime mover 12 is disconnected from the differential 18 and the clutch 70. Also, a series of contactors 100A-100C, 102A-102C, 104A-104C, 106A-106C, 108 and 110A-110C are in their deenergized state.

A block 126 opens contactors 102A-102C and 104A-104C so that the output of the power converter 58 is disconnected from the armature windings 60 of the PMM 34 and so that the input of the power converter 58 is disconnected 10 from the armature windings 51 of the control PMG 40. Further, contactors 106A-106C are closed by the block 126 so that the output of the power converter 58 is coupled to the armature windings 51 of the control PMG 40.

Following the block 126, a block 128 closes one or more contactors 108 to connect an external power source 114 to the power converter 58. In the preferred embodiment, the external power source 114 comprises an AC source of power. Alternatively, the power source 114 may comprise a DC source of power which is coupled to the DC link 74 of the power converter 58 illustrated in FIG. 2. The number and arrangement of contactors for connecting the external power source to the power converter 58 may be different than that shown in FIG. 4, if desired, and will generally depend upon the type of power converter used.

A block 130 then controls the power converter 58 to provide increasing voltage and frequency to the control PMG 40 at a constant V/F ratio so that the rotor structure 40a of the PMG 40, and thus the motive power shaft 28, are accelerated from standstill. Following the block 130, a block 132 checks to determine whether the speed of the motive power shaft 28 has reached a predetermined speed, and more particularly whether the shaft 28 has reached the synchronous speed of the main generator 44. After this speed has been achieved, a block 134 provides exciter field current to the exciter 42 so that a field winding 135 of the main generator receives excitation and thus develops AC power at its armature windings. A block 136 thereafter compares the phase and frequency of the main generator output with the output of a source of AC power, which may be, for example, the external power source 114 described previously. When the output frequency of the two are equal and the proper phase relationship exists, a block 137 closes the contactors 100A-100C and 110A-110C to connect the main generator armature windings to the power source 114. The main generator 44 is thus operated as a synchronous motor to develop motive starting power on the motive power shaft 28.

As should be evident, the frequency of the external AC source 114 is selected to be equal to the frequency of the output power developed by the main generator 44 when operating in the generating mode. Typically, this frequency is 400 hz. for aircraft applications.

Once the main generator 44 is operating as a synchronous motor, a block 138 opens the contactors 106A-106C and 108 so that the power converter 58 is disconnected from the control PMG 40. A block 139 commands the torque converter 122 to fill with oil so that the clutch 70 is coupled to the prime mover output shaft 26. This in turn causes the motive starting power on the shaft 28 to be transferred through the clutch 70 and the torque converter 122 to the prime mover 12 to accelerate same.

Following the block 139, a block 140 checks the output of the speed sensor 56 to determine whether the prime mover self-sustaining speed has been reached. Once this occurs, a block 142, FIG. 5b, opens the contactors 100A-100C to disconnect the external AC source 114 from the armature windings of the main generator 44. This also allows the generator 14 to decelerate so that the the direction of motive power flow reverses whereby power flows from the prime mover 12 to the generator 14. In addition, the contactors 102, 104 are closed so that the power converter is connected between the armature windings 51 of the control PMG 40 and the armature windings 60 of the PMM 34. Further, the torque converter 122 is drained, the clutch 70 is opened, the power converter 58 is operated to control the speed of PMM 34 and excitation is provided to the generator 14.

At this point, the prime mover is accelerating toward operational speed and is supplying motive power to the differential 18 via an overrunning clutch 144 which is connected across the torque converter 122. A block 146 then checks to determine whether the prime mover is at its minimum operational speed. Once this speed is achieved, a block 148 checks to determine when the main generator output frequency is at the desired frequency of, for example, 400 hz. Once the desired output frequency is achieved, a block 150 closes the contactors 100A-100C to connect the load(s) to the main generator 44. Following closing of the contactors 100A-100C, the contactors 110A-110C are opened to disconnect the external power source 114 from the main generator 44. Thereafter, the drive is in the generating mode, represented by a block 152, during which the PMM 34 is controlled as described above to provide an appropriate magnitude of make-up speed to the differential 18 to keep the output shaft 26 at the constant desired speed. Also, the excitation of the main generator 14 is controlled by the GCU 50 as described above to regulate, for example, output voltage.

Operation in the generating mode continues until the speed of the prime mover output shaft 26 drops below the lower limit. When this occurs, a slow speed interrupt is developed which causes control to pass to the interrupt routine illustrated in FIG. 6.

Upon generation of the slow speed interrupt, a block 170 closes the clutch 70 and opens the contactors 100 to disconnect the load(s) from the main generator 44. Control then pauses at a block 172 until the prime mover speed has risen above the lower limit. Once this has occurred, a block 174 opens the clutch 70 and a block 176 10 checks to determine when the main generator output voltage and frequency are at desired values. Once the main generator output voltage and frequency have stabilized at the desired values, a block 178 closes the contactors 100A-100C to reconnect the loads to the main generator 44.

Following the block 178 control returns to the generating mode of operation illustrated by block 152, FIG. 5b.

Figure 7:
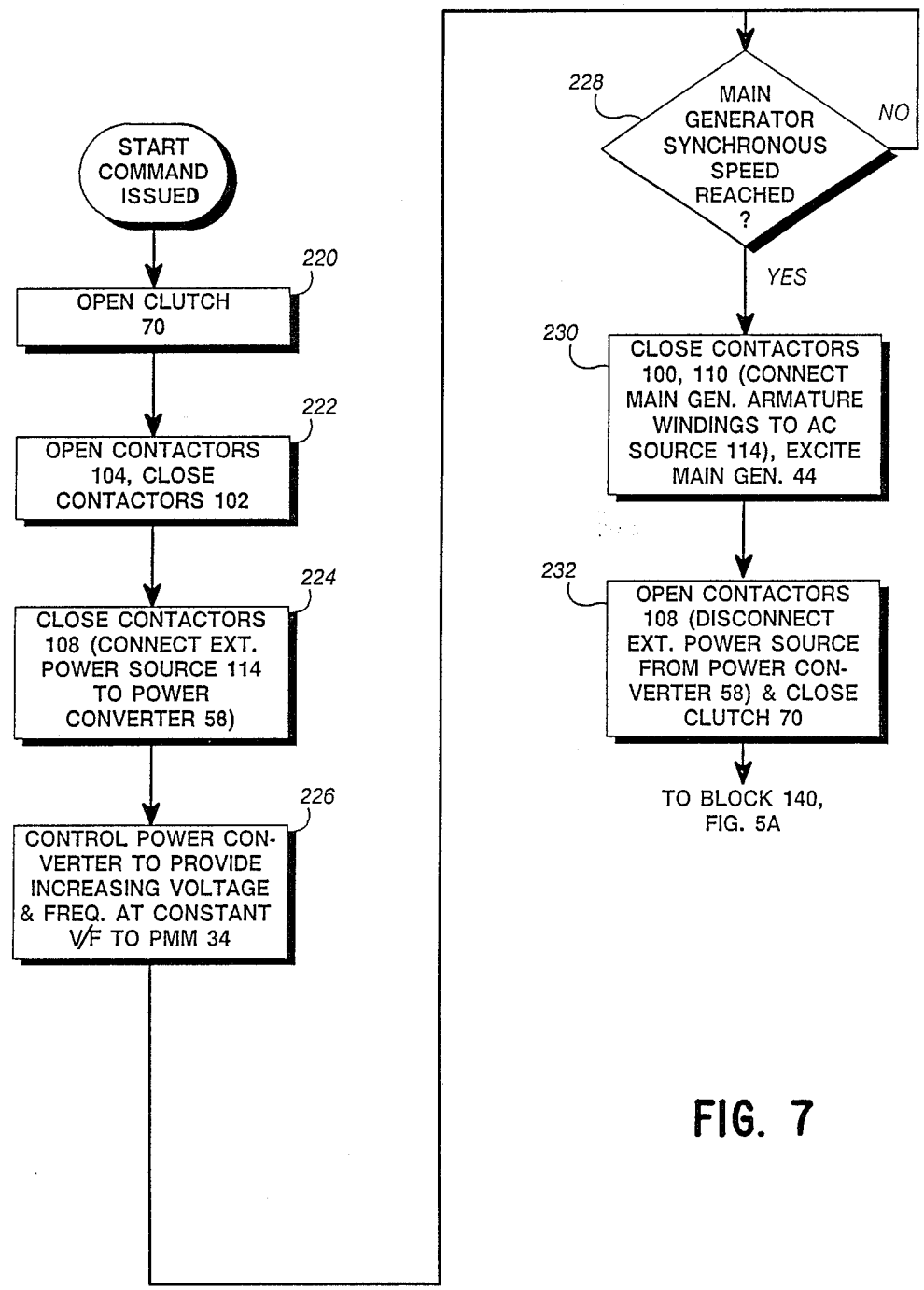
FIG. 7 is a flow chart illustrating a portion of the programming executed by the GCU of FIG. 4 to implement an alternative starting mode of operation.

As an alternative to the starting mode operation described above, the main generator 14 can be accelerated to synchronous speed using the PMM 34. In this case, the blocks 120–138 are replaced by the blocks 220–232 shown in FIG. 7. Also, it may be necessary to provide a brake to hold the differential input shaft 24 against rotation during operation in the starting mode.

Once a start command is issued on the line 112, a block 220 opens the clutch 70 and a block 222 opens the contactors 104A–104C. At this time the contactors 100A–100C are already open while the contactors 102A–102C are closed. Thus, the load(s) are disconnected from the armature windings of the main generator 44 and the input of the power converter 58 is disconnected from the control PMG armature windings 51. Also, the output of the power converter 58 is coupled to the armature windings 60 of the PMM 34.

A block 224 then closes the contactors 108 so that the external power source 114 is coupled to the power converter 58. The power converter is thereafter controlled by the GCU 50 to provide increasing voltage and frequency at a constant V/F ratio to the PMM 34 so that the PMM 34 is accelerated. It should be noted that, unlike the previous embodiment of the starting mode, the torque converter 122 has not been emptied prior to this point and hence the prime mover 12 remains connected to the first differential input 10 shaft 24. The prime mover 12 exerts substantial drag on the input shaft 24 and hence acceleration of PMM 34 in turn accelerates the output shaft 26 and the motive power shaft 28 of the generator 14. Once the main generator is rotating at synchronous speed, a block 230 closes the contactors 100A–100C and 110A–110C to connect the external AC power source 114 to the armature windings of the main generator 44 and appropriate excitation is supplied to the field winding 135 of the main generator 44 under control of the GCU 50. A block 232 then opens the contactors 108 and closes the clutch 70 so that a path for the motive starting power developed by the main generator 44 is provided to the prime mover 12.

Control from the block 232 passes to the blocks 140–152, FIGS. 5a and 5b, with the exception that the block 142 need not close the contactors 102A–102C since such contactors are already closed.

The constant speed drive of the present invention is simple in design and provides a favorable energy density figure when compared against competing designs. Also, prime mover starting is effected in a simple fashion without the addition of numerous components which add to the size and weight of the drive.

We claim:

1. An electrically compensated constant speed drive for producing constant frequency AC power from variable speed motive power produced by a prime mover, comprising:
    a mechanical differential including first and second input shafts and an output shaft wherein the prime mover is coupled to the first input shaft;
    a brushless generator having a rotor coupled to the output shaft and including a control permanent magnet generator (PMG) and a main generator which develops output power;
    a dynamoelectric machine having a motive power shaft coupled to the second input shaft of the differential and electrical power windings;
    a power converter interconnecting the control PMG and the electrical power windings of the dynamoelectric machine; and
    means coupled to the power converter for controlling the flow of power between the control PMG and the dynamoelectric machine whereby the dynamoelectric machine develops compensating speed of a magnitude sufficient to maintain the output shaft of the differential and the brushless generator rotor at a desired speed so that the brushless generator develops the constant frequency AC power.

2. The electrically compensated constant speed drive of claim 1, wherein the power converter comprises a rectifier and inverter.

3. The electrically compensated constant speed drive of claim 1, wherein the power converter comprises a cycloconverter.

4. The electrically compensated constant speed drive of claim 1, wherein the dynamoelectric machine is of the permanent magnet type.

5. The electrically compensated constant speed 2 drive of claim 1, wherein the power converter comprises a rectifier coupled to the control PMG and an inverter coupled between the rectifier and the dynamoelectric machine wherein power flow is unidirectional from the control PMG to the electromechanical machine through the rectifier and inverter so that the dynamoelectric machine operates as a motor.

6. The electrically compensated constant speed drive of claim 1, wherein the drive is operable to maintain the speed of the differential output shaft constant for prime mover speeds above a lower limit and further including a clutch coupled between the first input shaft and the output shaft of the differential which is closed when the prime mover speed is below the lower limit so that the differential is bypassed and which is opened when the prime mover speed is above the lower limit so that the motive power produced by the prime mover is transferred through the differential.

7. The electrically compensated constant speed drive of claim 1, further including a clutch coupled between the first input shaft and the output shaft of the differential and means responsive to the speed of the prime mover for controlling the clutch to bypass the differential when the prime mover speed is less than a certain speed.

8. The electrically compensated constant speed drive of claim 1, wherein the drive is operable in a generating mode during which the brushless generator develops the constant frequency AC power and a starting mode during which the drive is operated to bring the prime mover up to self-sustaining speed and further including means for controllably disconnecting the prime mover from the differential input shaft, means coupled between the differential output shaft and the disconnecting means for bypassing the differential and a control unit having means for controlling the disconnecting means and the bypassing means while in the starting mode to disconnect the prime mover from the differential and to bypass the differential, means for controlling the power converter to accelerate the brushless generator up to a particular speed, means operable once the generator has reached the particular speed for connecting a source of external AC power to the brushless generator to cause it to operate as a motor and means for controlling the disconnecting means to connect the prime mover to the brushless generator through the bypassing means once the generator is operating as a motor to accelerate the prime mover.

9. A method of Operating a constant speed drive to accelerate a prime mover connected thereto to self-sustaining speed wherein the drive includes a differential having a first input shaft coupled to the prime mover, a second input shaft coupled to a motive power shaft of a dynamoelectric machine and an output shaft coupled to a motive power shaft of a brushless generator, wherein the brushless generator includes a control permanent magnet generator (PMG) having armature windings interconnected to field windings of the dynamoelectric machine by a power converter and a motive power shaft coupled to a main generator, the method comprising the steps of:

connecting a source of power to the power converter; operating the power converter to provide power to either of the dynamoelectric machine and the control PMG to accelerate the motive power shaft of the brushless generator to a particular speed;

connecting a source of power to armature windings of the main generator to cause same to operate as a motor and thereby develop motive starting power; and providing a path for the motive starting power around the differential to the prime mover to in turn accelerate the prime mover to self-sustaining speed.

10. The method of claim 9, wherein the step of providing comprises the step of closing a clutch connected between the output shaft of the differential and the first input shaft thereof.

11. The method of claim 9, including the further step of closing a clutch connected between the output shaft of the differential and the first input shaft thereof before operating the power converter and wherein the step of providing comprises the step of operating a torque converter to connect the prime mover to the first input shaft of the differential.

12. A method of operating a constant speed drive to accelerate a prime mover connected thereto to self-sustaining speed wherein the drive includes a differential having a first input shaft coupled to the prime mover, a second input shaft coupled to a motive power shaft of a dynamoelectric machine and an output shaft coupled to a motive power shaft of a brushless generator, wherein the brushless generator includes a control permanent magnet generator (PMG) having armature windings interconnected to field windings of the dynamoelectric machine by a power converter and a motive power shaft coupled to a main generator, the method comprising the steps of:

providing a path for motive power between the output shaft of the differential and the first input shaft thereof;

disconnecting the prime mover from the first input shaft of the differential;

connecting a source of power to the power converter;

connecting the power converter to the control PMG;

operating the power converter to accelerate the motive power shaft of the brushless generator up to a particular speed;

connecting a source of AC power to the main generator to operate same as a motor so that motive starting power is developed thereby; and reconnecting the prime mover to the first input shaft of the differential so that the motive starting power is delivered to the prime mover to accelerate same to self-sustaining speed.

* * * * *